United States Patent [19]

Cecil

[11] 4,008,384
[45] Feb. 15, 1977

[54] WELDING APPARATUS

[75] Inventor: Shelby Cecil, Medina, Ohio

[73] Assignee: Glitsch, Inc., Dallas, Tex.

[22] Filed: Nov. 19, 1973

[21] Appl. No.: 416,745

[52] U.S. Cl. .......................................... 219/125 R
[51] Int. Cl.² .......................................... B23K 9/12
[58] Field of Search ......... 219/124, 125 R, 125 PL, 219/126; 318/567, 570, 576

[56] References Cited

UNITED STATES PATENTS

| | | | |
|---|---|---|---|
| 2,441,748 | 5/1948 | Black | 219/124 |
| 2,900,486 | 8/1959 | Williams et al. | 219/125 R |
| 2,927,992 | 3/1960 | Bateman | 219/125 PL |
| 3,150,624 | 9/1964 | Brems | 219/125 PL |
| 3,267,251 | 8/1966 | Anderson | 219/125 PL |
| 3,443,732 | 5/1969 | Wall, Jr. et al. | 219/125 R X |
| 3,681,564 | 8/1972 | Hiyama et al. | 219/125 R |

*Primary Examiner*—J. V. Truhe
*Assistant Examiner*—Clifford C. Shaw
*Attorney, Agent, or Firm*—Arthur L. Cain; Marvin A. Naigur

[57] ABSTRACT

A system for supporting, guiding and controlling a welding head to maintain the welding head normal to the instantaneous surface contour of overlapping, convoluted metal sheets to weld the same together. The system is capable of being supported on the convoluted metal sheets regardless of the relative orientation (vertical, oblique or downwardly or upwardly horizontal) of the sheets. In order to maintain a preselected penetration, consistently throughout the welding of the sheets, the orientation of the weld head, the amount of heat developed at the weld head and the rate of speed of travel of the weld head are precisely regulated. The orientation of the weld head relative to the sheet is controlled by a mechanical sensor which activates a preprogrammed configuration device displaying characteristics substantially identical with any particular departure from the normally linear surface of the sheets. With the exception of the departures from the linear portion of the sheets, the system is programmed to proceed linearly according to predetermined conditions.

8 Claims, 9 Drawing Figures

WELDING APPARATUS

BACKGROUND OF THE INVENTION

1. Field of the Invention

The invention relates generally to a system for welding identically convoluted metal surfaces and, more particularly, a combination for clamping a welding apparatus to the convoluted surfaces to guide and control the welding apparatus in order to weld identically convoluted surfaces in accordance with predetermined conditions without regard for the orientation of the surfaces.

Since the convoluted sheets are intended to be used to construct a relatively large, completely enclosed, self-supporting structure requiring welding the sheets together from the inside, the system must be relatively small and light-weight and capable of performing the welding at every possible angle. Also, the system is required to perform the welding without aid of physical support with the exception of the convoluted surfaces adjacent the welding seam.

2. Description of the Prior Art

Control systems for performing automatic welding operations are known in the art. Guiding a welding apparatus in response to changes in the vertical and/or horizontal position of the welding seam or the vector result thereof is shown, for example, by U.S. patent application Ser. No. 874,153 filed Nov. 5, 1969. In such instances, the welding apparatus and workpiece move relative to one another to effect the welding of a seam or line on the workpiece. A probe detects variations in the vertical and/or horizontal position of the seam in space and generates a signal which is utilized to position the welding torch at the vectorial result of such changes.

The apparatus of the present invention also varies the positioning of a welding apparatus automatically in response to changes in the spacial location of the welding seam. In this instance, however, the relative position of the welding apparatus perpendicularly with respect to the major plane of the convoluted sheets is one of the changes which must be effected with regularity. Varying this dimension with respect to a workpiece having a convoluted surface represents a considerable divergence from the standpoint of complexity and practicality of an automatic welding device.

Detecting changes in the relative position of the welding apparatus normal to a major plane, particularly where the deviations are considerable, such as the convoluted surfaces in the metal used in large shipping containers for liquified gas, fuel, and the like, and using the information obtained as a result of such detection to control the positioning of the welding apparatus, has proven difficult. Many attempts to automatically weld such containers have been made. None has been successful.

The problems of designing a system such as is necessary to effect the desired welding of sheets having convoluted surfaces are increased by the addition of the requirement that no filler material be utilized in welding the sheets. That is, two overlapping, convoluted sheets are heated to the point of melting and fusing the two, without adding any additional metal material. In a case such as this, the exact positioning of the welding apparatus is extremely important. If heat from the welding apparatus is applied at a point other than the overlap of the sheets, a burn-through is possible. Even if the mispositioning does not burn through the sheet, the desired penetration of the welding is dependent upon the proper positioning of the welding apparatus.

Still another consideration in the design of a system capable of welding convoluted sheet surfaces such as those of the present invention, involves varying the speed at which the welding apparatus travels in the direction of the weld. This becomes important due to the effects of a volume of air being present at the opposite side of the sheet in the areas of the convolutions. Such a volume of air is liable to cause a heat build-up in the sheets and, thus, a burn-through. While the problem of welding on the convolutions requires an increase in speed or decrease in current applied to the welding apparatus upon the approach thereto and initial welding thereof, the complexity and rate of change in direction of the convolutions necessitates a converse correction of the variables, after welding of the convolution is initiated and upon completion of passage thereover.

SUMMARY OF THE INVENTION

The primary object of this invention is to provide a new and improved system for automatic welding.

Other objects of this invention include the provision of a new and improved welding system which controls the movement of a welding head in three directions, fore and aft, laterally and/or up and down, or vertically, with respect to a surface to be welded, and include means for large and small vertical movements, as well as means to keep the welding head perpendicular, or normal, or at a predetermined angle relative to the welding surface, even though the surface to be welded includes arcuate or other surface portions in planes other than the major plane of the sheets being welded, such as convoluted surfaces; which maintains one direction of movement at a preselected constant valve relative to the welding seam, in other words which maintains a constant speed of the torch relative to the seam being welded, even if this requires varying the linear speed of the welding apparatus as a whole; which establishes the remaining directions of movement in a plane perpendicular to the surface to be welded; which controls the movement of a welding head longitudinally with respect to the surface to be welded; and which controls the movement of a weld head toward and away from the surface to be welded.

Still other objects of this invention are to provide a new and improved welding system which attaches to a convoluted surface; which inserts clamping members into depressions of a convoluted surface to effect a firm attachment thereto; which is quickly adjustable to both grasp and release a convoluted surface, as required, to reposition the welding system; and which securely attaches the welding system to a convoluted surface without resulting in marring or scratching of the convoluted surface.

Other objects of this invention include a new and improved welding system which maintains the degree of penetration of the heat produced by a weld head throughout the entire course of welding by the system; which maintains the welding penetration by controlling the effective current delivered to the weld head of the system; and which effectively maintains the penetration of the welding regardless of relative orientation of the weld head.

Further objects of this invention include a new and improved welding system, which, when activated, automatically tracks substantially longitudinally of a convoluted surface until such automatic tracking is deactivated by further control of the system; which system mechanically detects substantial deviations from a normally planer portion of a generally convoluted surface to thus deactivate preprogrammed automatic tracking of the normally planer portion; and which system substitutes programmable surface characteristics for the automatic tracking of the normally planer portions of the convoluted surface when substantial deviations from the normally planer surface are encountered.

Other objects of this invention involve a new and improved welding system which maintains the rate of travel of a weld head relative to a convoluted surface to be welded while adjacent a normally planer portion of the convoluted surface and which allows variation of the rate of travel of a weld head relative to a convoluted surface while adjacent substantial deviations from the normally planer portions of the convoluted surface in a predetermined manner depending upon which portion of a substantial deviation is immediately adjacent the weld head in order to maintain the welding rate constant over when the welding seam is along nonplaner surfaces.

Another object of this invention is to provide a new and improved welding system which continuously maintains the weld head at a predetermined angle, such as perpendicular or normal to the instantaneous surface of a convoluted or nonplaner surface to be welded without regard for the relative orientation of the convoluted or nonplaner surface.

Other objects of this invention include a new and improved welding system which provides a course adjustment for bringing a weld head adjacent to a convoluted surface to be welded by driving various carriages supporting the system and which provides a fine adjustment for bringing the weld head exactly adjacent to the convoluted surface to be welded by driving the weld head relative to the convoluted surface in response to a sensed function of the welding of the convoluted surface.

Still another object of this invention involves a new and improved welding system which includes matched, geared arc segments revolving about a common axis to cause a weld head to move independent of the longitudinal movement of the system and relative to the exterior of the arc segments at a rate of speed in excess of that possible using only one such geared arc segment to result in increased maneuverability of the weld head.

Other objects of this invention include providing a new and improved welding system which has an effective weight capable of being easily lifted by no more than two operators and which has over-all dimensions allowing extreme ease of maneuverability in positioning and otherwise handling the system.

A still further object of this invention is to provide a new and improved welding system which obtains one or more of the objects and advantages set forth above.

These and other objects and advantages of this invention will appear from the following description of preferred forms thereof, reference being had to the accompanying drawings.

DESCRIPTION OF THE PREFERRED EMBODIMENT

In order to construct a vessel or container of a rather substantial size without the need of any supporting structures inside the vessel, the surface of the vessel is designed to have structurally supporting elements or convolutions included as an integral portion thereof. The structurally supporting elements are arranged on the surface so as to intersect perpendicularly to one another in a symmetrical manner. The design of the surface to be welded in this preferred embodiment is the subject of an invention patented initially in France, and later in other countries, and is usually manufactured in panels measuring either three or ten feet by two feet. Such a vessel is constructed by overlapping metal panels, which include the structurally supporting elements, at the necessary orientations to form the bottom, sides, including oblique portions, and top of the vessel.

The vessel to be constructed using the invention of the above noted patent is a portion of an entire system of transporting liquid gas on ocean-going ships. The system, known by the name of the inventor, is called the membrane system. The vessel, when constructed of the welded, overlapped sheets, is intended to contain propane at extremely low temperatures to enable the normally gaseous material to be transported as a liquid.

Since the vessel is desired to be completely sealed, the metal panels are welded at all overlapping seams. A number of problems are presented in this respect. One problem involves the need to weld the panels at any particular orientation. Another problem exists as a result of the convolutions present on the panels. Automatically welding the panels and intervening convolutions results in the necessity of the system being considerably complicated. Still another problem is the necessity that the surface of the panels be clean, clear and free of marring, scuffing or other such or more serious damage when the welding is completed.

Figure 1:
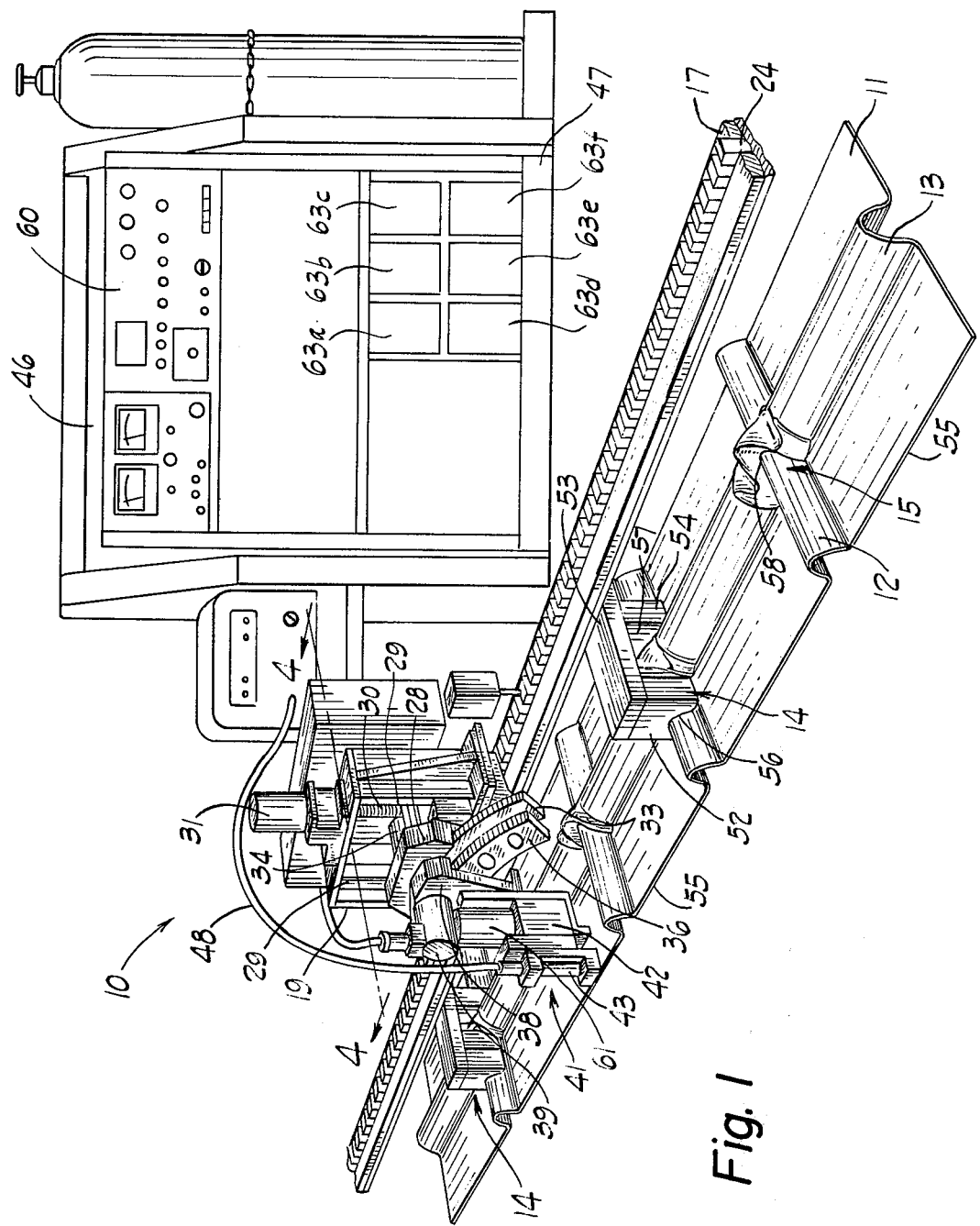
FIG. 1 is a front perspective view of a welding system embodying a preferred form of this invention.

FIG. 1 illustrates a system indicated generally at 10 for automatically welding overlapping metal sheets or panels 11, having formed therein intersections structurally supporting elements or convolutions 12 and 13, formed therein. In order to hold the welding head against the welding surface, a number of clamping devices 14 embodying this invention securely grasp the surface of the panels 11 at points 15 where the supporting elements intersect.

A guide rail 17 is securely attached to the clamping devices 14 in a manner allowing the rail 17 to be adjustably positioned relative to any edge of the sheet or panel 11. The rail 17 is further adjusted to be parallel to the edge of the panel 11 desired to be welded. A carriage 19 which supports the remainder of the welding system 10 is arranged to rest on and travel across the guide rail 17.

Figure 4:
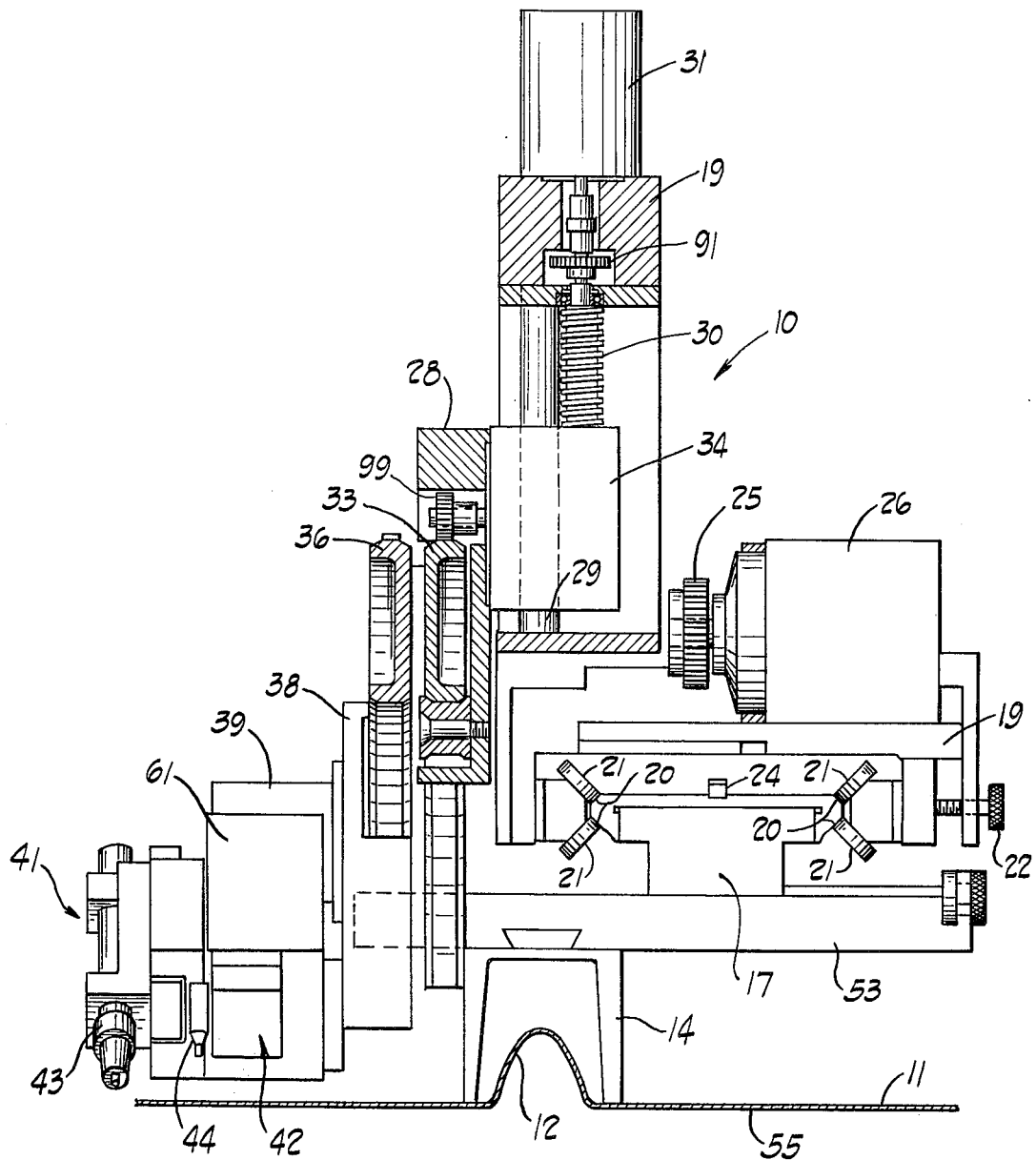
FIG. 4 is a front view of the welding system shown in FIG. 1.

For purposes of supporting the carriage 19 on the guide rail 17, beveled surfaces 20 are provided on the rail 17 with which the carriage 19 is arranged to engage by reason of roller followers 21 adjustably positioned by reason of a latch 22 shown in FIG. 4. The guide rail 17 also includes a rack gear 24 extending the entire length of the rail 17. This rack gear 24 is engaged by a suitable gearing mechanism 25 included as part of the carriage 19 and driven by a controllable motor 26 included on the carriage 19. By controlling the activation of this motor 26, the carriage 19 may be positioned at any point along the guide rail 17.

The carriage 19 is equipped with a first sub-carriage 28 which is mounted to appropriate guide members 29 on the carriage 19. A screw drive 30 engages the sub-carriage 28 and is driven by a controllable drive motor 31. A first arc gear segment 33 is attached to the first subcarriage 28 in a manner allowing the first arc gear segment 33 to be moved relative to the first subcarriage 28. For this purpose, another controllable drive motor 34 is arranged to engage the first arc gear segment 33 to effect the movement. A second arc gear segment 36 of identical construction is securely fastened to the first arc gear segment 33 so as to be exactly overlying. Supported by the second arc gear segment 36 and independently movable relative to the first subcarriage 28 is a second subcarriage 38. This second subcarriage 38 is equipped with a controllable drive motor 39 provided with appropriate gearing for engaging the second arc gear segment 36.

The second subcarriage 38 has a weld head assembly 41 mounted thereon comprising an arc voltage control unit 42 purchased from TekTran Division of Air Products & Chemical, Inc. as part of a 150 amp. welding system, a welding torch 43, and a mechanical sensor 44 for detecting variations in the surface of the panels 11 to be welded.

The welding system 10 also includes a power supply 46 manufactured by TekTran Division of Air Products & Chemical, Inc. The power supply 46 has been considerably modified to include the controls necessary for this welding system 10. The power supply, before modification, is more completely described in TekTran bulletin number WP-1 and identified as model number TT-150. A suitable rack 47 is provided for supporting the power supply 46 and equipment 49 necessary to produce the arc for welding the panels 11.

The power supply, before modification, is of a type standard in the welding equipment industry providing for a selectable, constant current electrical source for an arc welding torch, such as torch 43. In addition, the particular power supply 46 used in this instance as purchased from the manufacturer, including provisions for establishing the required electrical current in a series of pulses rather than merely a level.

This pulsing of the power supplied to the welding torch provides notable advantages in the welding of materials, as noted at page 2, lines 14 through 23 hereof. The instant power supply 46, as purchased, further includes appropriate control circuitry for selecting the amplitude and duration of the pulses so provided.

One further addition to this particular power supply 46, but not necessarily unique in the welding equipment industry, is a provision for applying an AC signal superimposed upon each of the series of pulses. The amplitude and frequency of this AC signal is capable of selectable variation from the control panel of the power supply.

Further modifications required to be made of the power supply 46 are discussed at a subsequent portion of the disclosure.

The equipment for producing the welding arc is connected to the power supply 46 by appropriate cable connections and the torch 43 by a single cable 48. The power supply 46 in turn is connected to the remainder of the welding system 10 by appropriate connections.

The clamping devices 14, shown in FIG. 1, must be capable of supporting the welding system 10 regardless of the relative orientation which the panels 11 assume. In this regard, in forming the vessel desired to be constructed, the panels 11 are positioned horizontally, vertically or any combination thereof. However, in attaching the clamping devices 14 to the surface of the panels 11, clamping devices 14 are required not to undesirably affect the surface of the panels by marring or scratching.

The number of clamping devices 14 utilized to support the welding system 10 depends upon the length of the panels 11 to be welded. In this regard, for a panel 11 having a length of only three feet, two clamping devices 14 are preferred to support the system. However, when the panel length to be welded is ten feet, four clamping devices 14 are preferred to adequately support the system. As further shown in FIG. 3, the clamping devices 14 include a locking toggle 50 to effectively immobilize the system with respect to the clamping devices 14 and thus the panel 11. When only two clamping devices 14 are present, both include functional locking toggles 50 so that the welding system 10 may be positioned with respect to the edge of a panel 11 and immobilized. However, when more than two clamping devices 14 are present, only two of the clamping devices 14 have functional locking toggles 50 while the remaining clamping devices 14 effectively float with respect to the guide rail 17.

Figure 2:
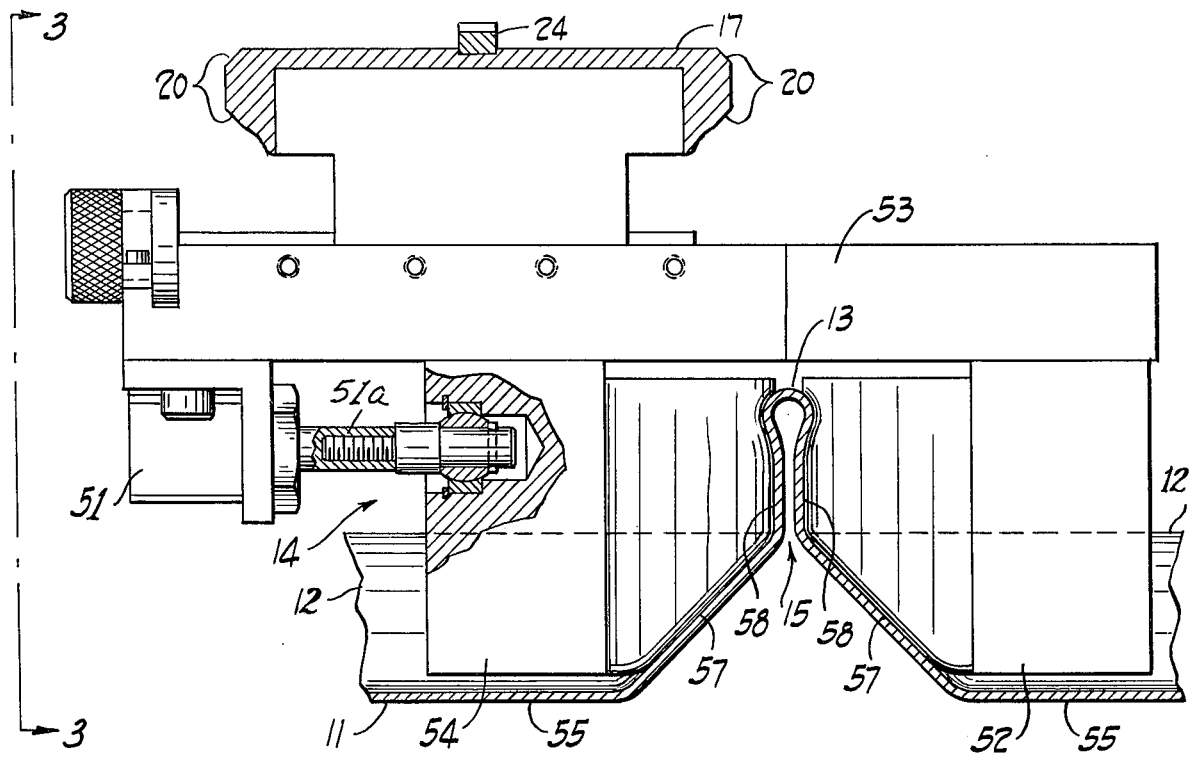
FIG. 2 is a view, partially in section, showing the means of this invention for holding the welding head to the welding surface.
Figure 3:
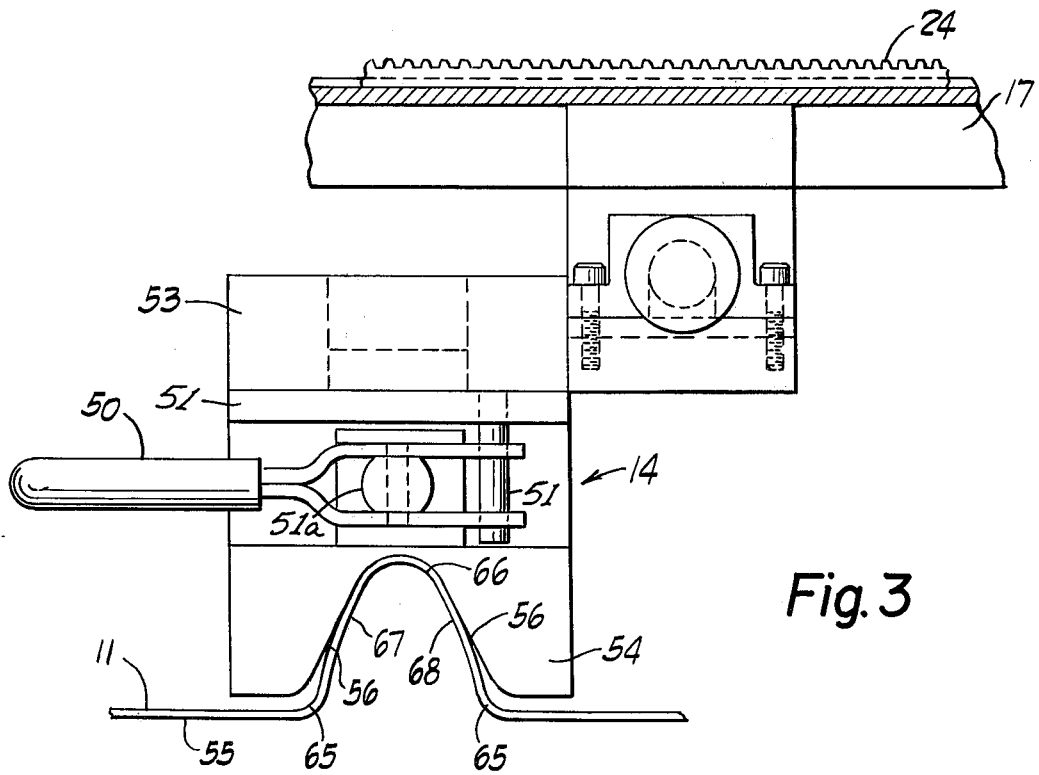
FIG. 3 is a view taken along the line 3—3 of FIG. 2.

A portion of one of the clamping devices 14 and the panel 11 are shown in FIG. 2. The clamping devices 14 include a first member 52 securely fastened to a frame 53 and a second member 54 attached to the frame 53 in a manner allowing the second member 54 to slide relative to the frame 53. The locking toggle 50 illustrated in FIG. 3 is partially shown in FIG. 2. It is pivotally connected at one end to a bracket 51 and intermediate to ends to a rod 51a, which extends from the toggle 50 to the second member 54. One side, 56, of both the first member 52 and second member 54 has a surface configuration corresponding to a cross section of one of the structurally supporting elements, in this case 12, of the panel. The first (52) and second (54) members are designed so that only the structurally supporting elements 12 and 13 are contacted by the member. In this manner, marring or scratching of substantially flat surface 55 of the panels 11 is not normally possible.

A second face 57 of the first member 52 is symmetrically designed relative to a second face of the second member 54 so that the first and second faces correspond to a cross section of the intersection 15 of the structurally supporting elements 12 and 13 on the panel surface.

The panel 11 surfaces are designed as shown further by the above noted French patent, so that depressions 58 occur at the projection 15 of intersection of the structurally supported elements 12 and 13. The occurrence of the depressions 58 is symmetrical at each individual intersection 15 of the convolutions 12 and 13 on the surface of the panel 11. These depressions 58 constitute positions to which the clamping devices 14 are positively attached to prevent any movement between the panel 11 and the clamping devices 14.

Once the panels or sheets 11 are positioned as desired and are ready to be welded, the welding system 10 is attached to the sheet 11 as discussed above. Since the welding is intended to occur along the overlapping edge of the sheet, the system 10 is positioned parallel to the direction in which welding is to occur by adjustment of the guide rail 17 relative to the clamping devices 14 as also discussed previously. This movement aligns the torch 43 with the edge of the panel or sheet 11 to be welded.

At this time, the system 10 is activated by initiating control at either a control panel 60 (FIG. 1) on the power supply 46 or a remote control device (not shown). After the required purge time for rendering the torch 43 operable, the system 10 begins to track along the panel 11. The panels are designed such that the initial edge of the sheet to be welded is always the substantially flat portion 55, rather than one of the structurally supporting elements or convolutions 12 and 13.

The torch 43 commences welding at a given speed, current, power supply amplitude and pulse duration as programmed by the power supply 46. The control of these functions and conditions are detailed at a subsequent portion of this discussion. The torch 43 proceeds along the edge of the sheet 11 by reason of activation of the controllable motor 26 which engages the rack gear 24 on the guide rail 17 and moves the carriage 19 longitudinally with respect to the welding path. The timing and magnitude of the control supplied to this controllable motor 26 are a function of the characteristics of the surface of the panel or sheet 11. Thus, while a specific speed of travel along the welding path may be desired, complicated movements of the weld head assembly 41, due to encountering structurally supporting elements or convolutions 12 and 13, require the longitudinal travel of the carriage 19 to be reduced.

As the torch 43 moves along the edge of the panel 11 to be welded, two important aspects of the orientation of the torch 43 are maintained. First, the torch 43 is always substantially the same predetermined distance from the surface of the panel 11. Second, the torch 43 is always normal to the surface to be welded, at each instant in time.

The first of these requirements is adjusted for by the controllable drive motor 31 engaging the screw gear 30 which causes the first subcarriage 28 to move either toward or away from the surface to be welded and a motor 61 on the arc voltage control unit 42 on the weld head assembly 41 which causes the torch 43 to move relative to the second subcarriage 38.

The second of the requirements is solved as a direct result of the movement of the first arc gear segment 33 relative to the first subcarriage 28 caused by activating the controllable drive motor 34 and the movement of the second subcarriage 38 relative to the second arc gear segment 36 caused by activating the controllable drive motor 39.

The operation of the welding system 10 commences, as noted above, with the torch 43 traveling along a straight line substantially equivalent to the edge of the sheet 11 to be welded. The torch 43 is positioned so that welding of the sheet 11 is effected once movement has started. In the event than any relatively small deviation in the surface is encountered, the arc voltage control unit 42 is designed to detect a difference in the arc developed at the surface and adjust the distance between the torch 43 and the surface by activating the motor 61 to either move the torch 43 toward or away from the surface.

As the torch 43 is moved longitudinally along the substantially flat portion 55 of the sheet or panel 11, the mechanical sensor 44 is activated by any occurrence of a substantial deviation from the normally flat surface. These occurrences of substantial deviations correspond under normal circumstances to the presence of the structurally supporting elements or convolutions 12 and 13. The activation of the mechanical sensor 44 causes the operation of the welding system 10 to be controlled by a timed sequence of control functions.

The control functions are programmed into the system 10 through the utilization of a series of variable information electrostatic reading devices 63 (shown in FIG. 1). The electrostatic reading devices 63 in the present invention called Data-track, Model 5310 card programmers, were purchased from Research, Inc. and incorporated into the power supply 46 by modification of the circuits and hardware of both the power supply 46 and the reading devices 63.

The Data-track reading devices as purchased from Research, Inc., are designed to operate at a speed below the intended travel speed of the weld head assembly 41. For this reason, modification of the reading devices 63 is required to gear up the card drive, in order that the cards move at the same speed as the weld head assembly; i.e., from about 7 to about 20 inches per minute. The purpose in this modification is to enable reading of the information without the necessity of having memory devices for starting the same.

Since the entire welding system 10 envisages a number of such reading devices 63, the devices are further modified to enable only a specific card to be inserted into each device, in order to render the system fool proof.

Both the reading devices 63 and the power supply 46 require modification, both mechanically and electrically, in order to interface the devices. The reading devices must be physically mounted in the power supply 46. Sources of power adequate to operate the necessary function of the reading devices 63 must be provided for within the power supply 46.

The power supply must be modified to accept and utilize the information supplied to it by the reading devices. The application of the Data-track reading devices 63 is further described at a subsequent portion of the present disclosure.

The initial control function in the timed sequence begins as soon as the mechanical sensor 44 detects the approaching convolution 12 or 13. The angle at which the torch 43 is positioned relative to the panel 11 is succeedingly altered. This angle change is a direct result of activating the controllable drive motors 34 and 39, simultaneously, to cause the weld head assembly 41 to be pivoted relative to the surface of the panel 11. Information resulting in the angle change is programmed by one of the electrostatic reading devices 63.

As the angle of the torch 43 changes, the carriage 19 continues to be driven in a longitudinal direction by the controllable motor 26. In addition, the torch 43 is capable of movement toward and away from the surface of the panel 11 as a result of the motor 61 of the arc voltage control unit 42 included in the weld head assembly 41. The operation continues in this manner until the torch 43 has pivoted to a position which is substantially parallel to the flat surface 55 of the panel 11. During this time, the torch 43 has been activated to weld the entire radius 65 at the juncture of the convolution 12 or 13 and the flat portion 55 of the panel or sheet 11.

The angular movement of the torch 43, as noted above, is effected by the activation of the controllable drive motors 34 and 39. These motors move the first arc gear segment 33 relative to the first subcarriage 28 and the second subcarriage 38 relative to the second arc gear segment 36, respectively. Since the first (33) and second (36) arc gear segments are securely fastened together, the simultaneous activation of the controllable drive motors 34 and 39 results in the displacement of the torch 43 being equivalent to twice the angular movement attributable to either motor or 34 or 39, singularly. The practical effect of this arrangement is that a particular angular position of the torch 43 is reached in one-half the time which would be required to attain the identical position with only one such gear segment.

Figure 5:
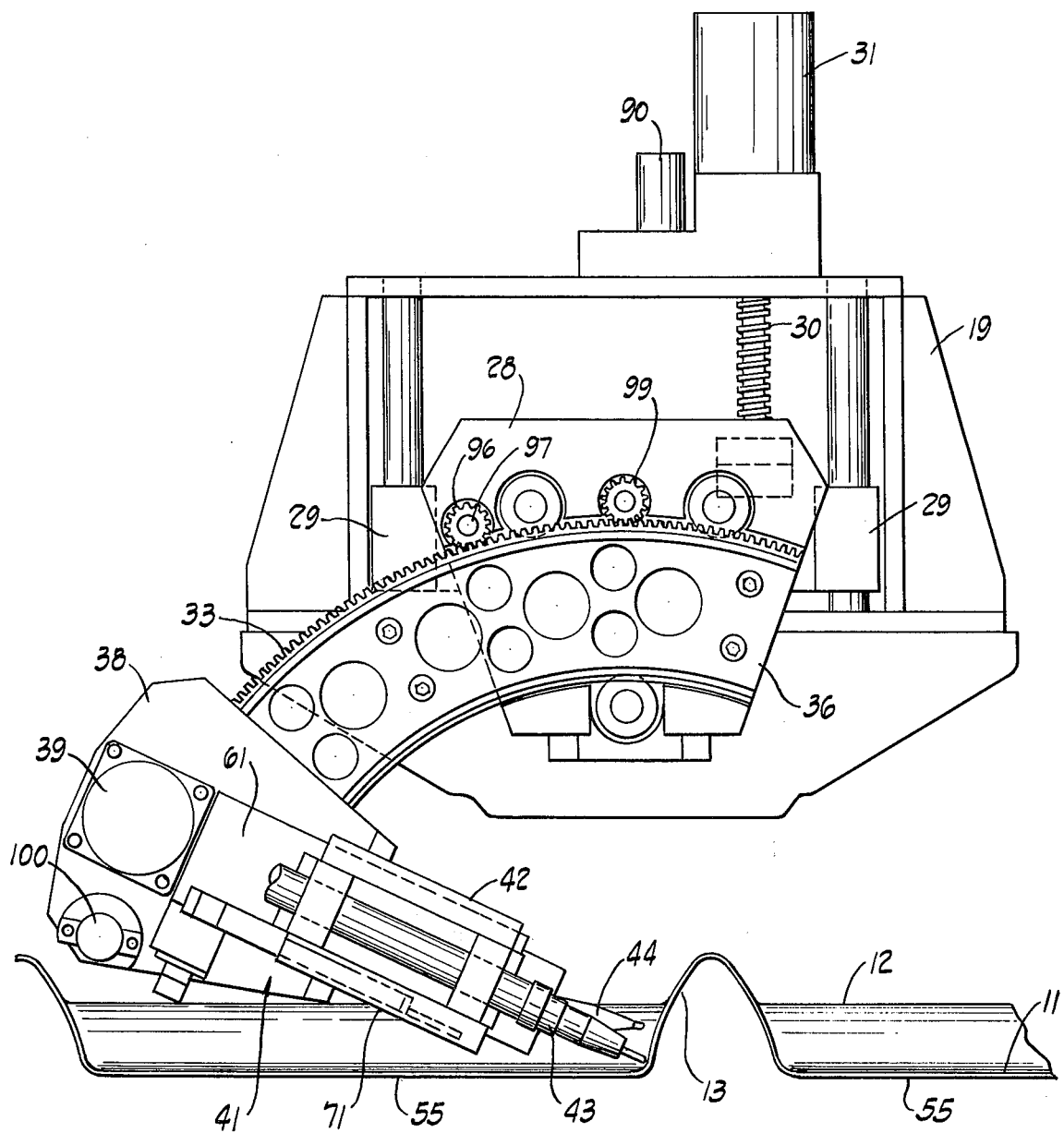
FIG. 5 is a side view of the system shown in FIG. 1 illustrating the arc gear arrangement.

FIG. 5 illustrates the position of the welding torch 43 immediately at the beginning of the next control function in the timed sequence. When the torch has completed the welding of the radius 65 at the juncture of the convolution 12 or 13 and the flat surface 55, the second portion of the timed sequence begins to control the movements of the torch 43. During this portion of the welding, the controllable motor 26 for causing longitudinal movement of the carriage 19 is disabled. From this point until the crest 66 of the convolution 12 or 13 is reached, i.e., a point where an outwardly extending, nearly linear portion 62 of the convolution meets the curved portion at the external extreme of the convolution, the torch 43 is controlled by variable information programmed by the electrostatic reading device 63 comprising the torch angle and linear separation from the substantially flat surface 55. The only adjustment toward and away from the instantaneous surface while this portion of the surface is being welded is afforded by reason of the motor 61 responding to the arc voltage control unit 42. As the linear separation information moves the first subcarriage 28 away from the panel 11 surface, the torch angle information activates the controllable drive motors 34 and 39 to pivot the torch 43 perpendicular to the surface of the convolution 12 or 13.

A third portion of the timed sequence controls movement of the torch 43 from the juncture of the crest 66 at the outwardly extending, nearly linear portion 67 of the convolution to the juncture at the corresponding inwardly extending, nearly linear portion 68 of the convolution. During this time, the controllable motor 26 for causing longitudinal movement of the carriage 19 is reactivated. However, the motor 61 normally responding to the arc voltage control unit 42 is disabled throughout this portion of the welding. Therefore, the control of the torch 43 movement is obtained solely through longitudinal carriage 19 movement, torch angle and linear separation from the substantially flat surface 55.

This third portion of the timed sequence results in the torch 43 being moved through most of the rotational movement, possibly due to the first 33 and second 36 arc gear segments. The movement of the first subcarriage 28 in response to the linear separation information maintains the distance between the torch 43 and the surface of the convolution 12 or 13 throughout this portion of the sequence.

The fourth portion of the timed sequence starts at the juncture of the crest 66 and the inwardly extending portion 68 of the convolution 12 or 13 and ends when the radius 65 at the juncture with the substantially flat portion 55 of the panel 11 begins. During this time, as with the outwardly extending portion 68 of the convolution, the controllable motor 26 for causing longitudinal motion is disabled. Therefore, the torch angle, linear separation and arc voltage control unit 42 supply the necessary control for the movement of the torch 43. At the extreme end of this portion, the torch 43 is positioned substantially parallel to the flat surface 55 of the panel. In this position, the first (33) and second (36) arc gear segments and the second subcarriage 38 are substantially at the extreme limit of travel pivotally in a clockwise direction as viewed in FIG. 5.

During the last portion of the timed sequence for controlling the torch movement, the torch 43 is positioned to weld the radius 65 at the juncture of the convolution 12 or 13 and the flat surface 55 of the panel. Again, as before, the torch angle is succeedingly altered by activating the controllable drive motors 34 and 39 responsible for movement of the first (33) and second (36) arc gear segments and the second subcarriage 38. Longitudinal movement of the carriage 19 occurs as a result of activating the controllable motor 26. Also, the motor 61 is allowed to respond to the arc voltage control unit 42 and cause movement of the torch 43 toward or away from the surface to be welded.

Finally, when the torch angle has caused the torch 43 to pivot to a position perpendicular to the flat portion 55 of the sheet or panel 11, the radius 65 and, therefore, the convolution 12 or 13 have been completely welded. At this time, control of the torch movement is returned to the predetermined automatic operation. This operation continues until another convolution 12 or 13 is encountered by the mechanical sensor 44. The electrostatic reading devices 63 are automatically recycled after use in order to be prepared for another convolution.

Figure 7:
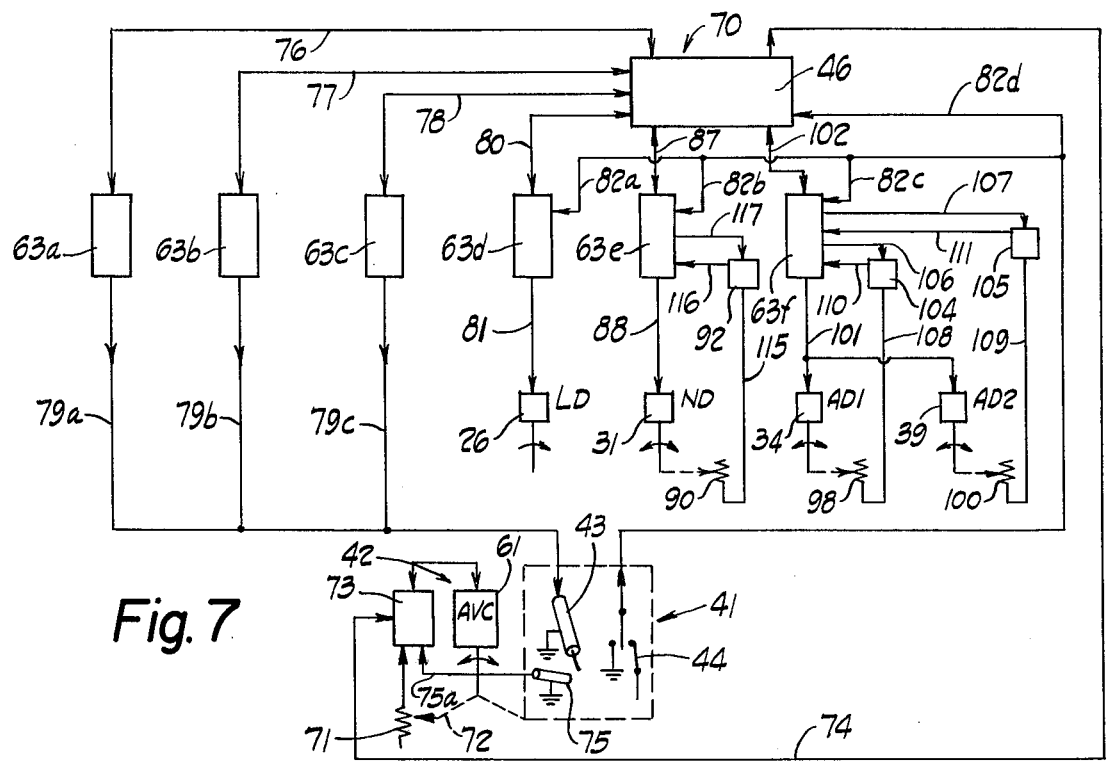
FIG. 7 is a block diagram illustrating one circuit for controlling the welding system.

The movement of the torch 43 relative to the surface to be welded is controlled at all times by the power supply 46 with the incorporated modifications including the electrostatic reading devices 63a, b, c, d, e and f. FIG. 7 illustrates the power supply 46 and the associated control circuits indicated generally at 70.

The weld head assembly 41 includes the torch 43, the mechanical sensor 44, the arc voltage control unit 42, and the motor 61 which moves the weld head assembly 41 when instructed to do so by the arc voltage control unit 42 through a lead 75a from a sensor 75. A linear potentiometer 71 is also included as part of the weld head assembly 41. This linear potentiometer 71 has a wiper 72 which moves in conjunction with the torch 43 in response to the arc voltage control unit 42. The position of the wiper 72 causes a voltage to be produced which is proportional to the distance which the torch 43 moves. This voltage is compared in an activation circuit 73 by means of any suitable electrical circuit, i.e., balanced bridge circuit, to a voltage supplied by the power supply 46 through a connecting lead 74. The voltage supplied by the power supply 46 is a result of a preselected value for the arc length between the torch 43 and the surface to be welded. When the arc voltage control unit 42 detects that the arc length is not equal to the desired value, the motor 61 is activated to move the torch 43 in the proper direction until the voltage values compare.

The torch 43 is supplied with a proper voltage and current for welding by the power supply 46 through three electrostatic reading devices 63a, b and c, in the case of this embodiment. A first electrostatic reading device 63a controls the welding current delivered to the torch 43. Since this current is required to be changed when different portions of the surface are being welded, the value is applied in a manner allowing the necessary variation of the current.

The power applied to the torch 43 is basically a DC voltage having a current value determined by the first electrostatic reading device 63a. However, an AC voltage is desired to be superimposed on the DC voltage. This AC voltage has the effect of pulsing the power supplied to the torch 43 which results in a beneficial effect. The pulsing causes the melted metal to flow rather than form puddles and, thus, results in an evenly welded seam. The AC voltage applied to the torch 43 is controlled by two electrostatic reading devices 63b and c in the present embodiment.

A first of the two reading devices 63b regulates the amplitude of the AC voltage. A second reading device 63c regulates the length of time for which the AC voltage exists, i.e., pulse width. Although, in the case of the present embodiment, the slope of the pulse, i.e., rise and fall of the pulse, is not controlled continuously, but rather is preset by the power supply 46, continuous regulation of the slope is possible through the use of an additional electrostatic reading device.

The three electrostatic reading devices 63a, b and c which control the power supplied to the torch 43 are connected to the power supply 46 by appropriate electrical cables 76, 77 and 78, respectively. The reading devices 63a, b and c are, in turn, connected to the torch 43 by appropriate electrical cables 79a, b and c, respectively.

The operation of the controllable motor 26, which causes movement of the carriage 19 longitudinally relative to the guide rail 17 and panel 11 surface, is regulated by an electrostatic reading device 63d. This electrostatic reading device 63d is connected to the power supply 46 by an electrical cable 80 and, in turn, connects to the controllable motor 26 by reason of an appropriate cable 81. As discussed above, the activation of the controllable motor 26 is unvarying while the substantially flat portions 55 of the surface are being welded. Once the mechanical sensor 44 detects the presence of a convolution 12 or 13, the activation of the controllable motor 26 is varied. For this reason, the mechanical sensor 44 is connected to the electrostatic reading device 63d which operates the controllable motor 26 by means of an electrical lead 82a. Thus, the controllable motor 26 is activated at a preselected speed until the mechanical sensor 44 enables the reading device 63d to control activation.

The first subcarriage 28 is preset at a stationary position as an initial condition of the welding system 10. Only when the mechanical sensor 44 detects an encountered convolution 12 or 13 on the panel 11 to be welded is the controllable drive motor 31 activated to cause movement of the first subcarriage 28. At such a time, an electrical lead 82b from the mechanical sensor 44 enables another electrostatic reading device 63e to activate the controllable drive motor 34 to result in the proper movement of the first subcarriage 28.

Figure 8A:
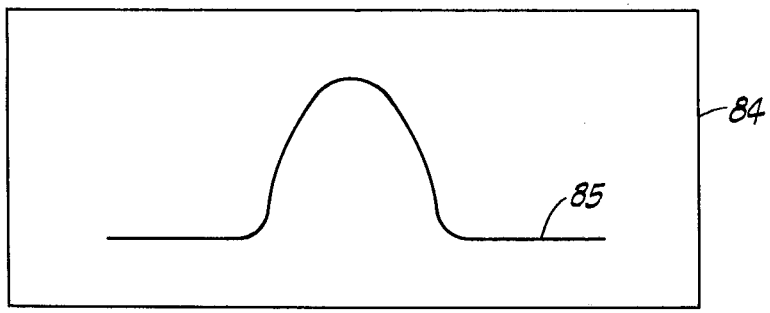
FIG. 8a is an example of the electrostatic card used to control linear displacement of the weld head.

FIG. 8a is a representation of a card 84 for the electrostatic reading device 63e, including the information necessary to effect the desired movements of the first subcarriage 28. Since the panel 11 to be welded is capable of attaining any orientation relative to the horizontal and vertical, the movements of the first subcarriage 28 are referred generally to in this embodiment as the linear separation between the torch 43 and the substantially flat surface 55 of the panel 11. As is evident from FIG. 8a, the information, represented as a waveform 85, substantially resembles the actual shape of the convolution to be welded. Therefore, the information on the card 84 is required to be altered for each particular convolution to be welded. The electrostatic reading device 63e is electrically connected to the power supply 46 by means of a cable 87 and likewise connected to the controllable drive motor 31 by a cable 88.

In FIG. 5, a potentiometer 90 is shown arranged to engage the screw gear 30 driven by the controllable drive motor 31 by reason of a gear mechanism 91 (shown in FIG. 4). When the screw gear 30 is rotated, a shaft of the potentiometer 90 rotates and results in the presence of a unique resistance dependent upon the movement of the first subcarriage 28. This unique resistance is utilized through connection by lead 115 by an activation circuit 92 for the controllable drive motor 31 which is connected to the electrostatic reading device 63e through a lead 117.

When the mechanical sensor 44 detects a convolution 12 or 13 approaching, the appropriate electrostatic reading devices 63d, e and f and the power supply 46 are activated. In the case of the reading device 63e, for the movement of the first subcarriage 28, by reason of electrical connecting leads 82a, b, c and d, respectively, when the information on the card 84 indicates that the first subcarriage 28 is to be moved, the controllable drive motor 31 is energized. This energization continues until the activation circuit 92 for this motor 31 indicates no further energization is required.

At this point, a discussion of the operation of the electrostatic reading devices 63a, b, c, d, e and f is in order. A typical card to be used in the reading device has a uniform electrostatic field throughout the surface of the card. Information is encoded onto the card by producing a line or wave from which interrupts the uniform electrostatic field. Reading of the information from the card is effected by calculating the position at which the uniform field is interrupted. A voltage is produced which is representative of this position. In the present embodiment, the position of interruption of the uniform field is established with respect to a predetermined base line. The base line is calibrated as a function of weld path or longitudinal distance along a panel to be welded. In this manner, the voltages which represent the position of interruption of the field are utilized to determine not only the degree of movement desired, but, also, the direction of movement.

Returning to the discussion of controlling the movement of the first subcarriage 28 once the controllable drive motor 31 has been energized a signal from the activation circuit 92 through lead 116 instructs the controllable drive motor 31 to stop. This signal to stop is a result of a comparison of the voltage from the electrostatic reading device 63e, indicating the position of interruption of the field, and a voltage produced by the unique resistance of the potentiometer 90. This comparison is accomplished through the use of any electrical circuit capable of performing this task, such as a balanced bridge. When the unique resistance of the potentiometer 90 is substantially equivalent to a resistance of a value sufficient to establish the voltage representative of the interruption of the electrostatic field, the activation circuit 92 produces the signal to stop the motor 31.

Any subsequent change in the position of interruption of the field causes corresponding changes in position of the first subcarriage 28 as a direct result of activation of the controllable drive motor 31.

Figure 8B:
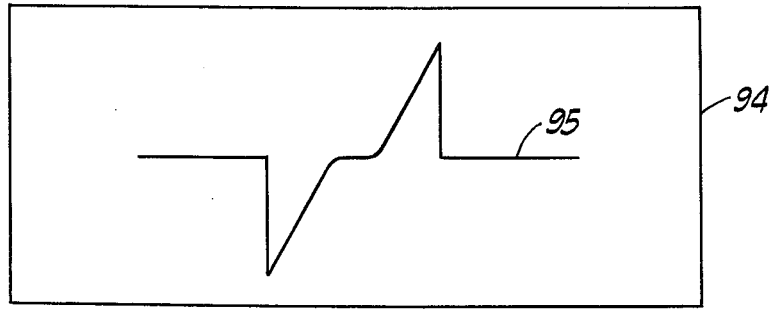
FIG. 8b is an example of the electrostatic card used to control angular displacement of the weld head.

The activation of the controllable drive motors 34 and 39, as discussed above, is simultaneous with one another. Therefore, one electrostatic reading device 63f controls the operation of both motors 34 and 39. FIG. 8b illustrates a card 94 to be read by the electrostatic device 63f, including the encoded information for controlling the motors. The information on the card 94 is representative of the angular displacement of the torch 43 relative to the panel to be welded. As in the case of the card 84 supplying linear separation information, the line 95 established on the card 94 interrupts the uniform electrostatic field and causes a voltage to be produced. The voltage in the case of angular displacement, represents both a direction and extent of the rotation of a desired angular displacement.

Figure 6:
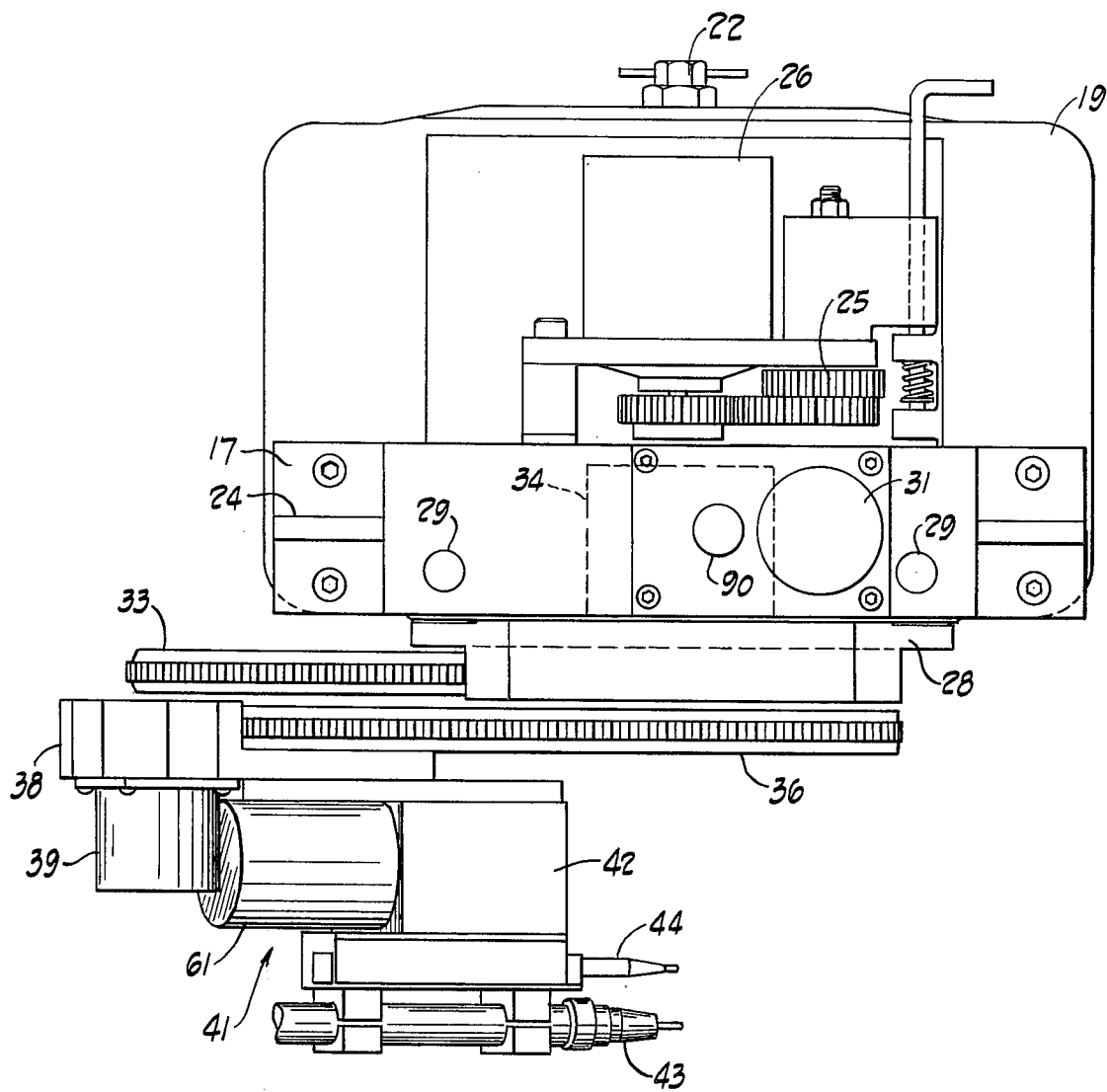
FIG. 6 is a top view of the system shown in FIG. 1.

The controllable drive motor 34 engages the first arc gear segment 33 by reason of a gear 99 and causes the gear segment 33 to pivot relative to the first subcarriage 28 when the motor 34 is activated. FIGS. 5 and 6 indicate the presence of a gear 96 which also engages the first arc gear segment 33. This gear 96 is securely attached to a shaft 97 of a linear potentiometer 98 mounted on the first subcarriage 28. Likewise, a gear (not shown in the Figures) engages the second arc gear segment 36 and is securely attached to a shaft (not shown) of a linear potentiometer 100 which, in this case, is mounted on the second subcarriage 38.

Operation of the controllable drive motors 34 and 39 is initiated, as in the case of the other motors, by the mechanical sensor 44 detecting the convolution 12 or 13, by reason of a lead 101 connected to the electrostatic reading device 63f. The electrostatic reading device 63f is electrically connected to the power supply 46 by a cable 102.

The occurrence of the convolution 12 or 13 causes the reading device 63f to begin reading the information, from the card 94. As explained previously, whenever the interruption of the uniform electrostatic field deviates from a base line, the reading device 63f produces a voltage characteristic of the extent and direction of the deviation.

As soon as a deviation of the information occurs, both controllable drive motors 34 and 39 are activated. The voltage produced by the reading device 63f is electrically connected to activation circuits 104 and 105 for each of the motors 34 and 39 by reason of leads 106 and 107, respectively. Resistance values produced as a result of rotation of the shafts of the potentiometers 98 and 100 are electrically connected to the activation circuits 104 and 105 by leads 108 and 109, respectively. As in the case of the other activation circuits 73 and 92, electrical devices such as balanced bridge circuits compare the resistances from the potentiometers 98 and 100 and the reading device 63f as a result of information of a deviation from the base line, and disables the activation of the controllable drive motors 34 and 39 through leads 110 and 111 when the resistance values are substantially equivalent.

The power supply 46, arc voltage control unit 42 and electrostatic reading devices 63a, b, c, d, e and f all require various degrees of modification. In the case of the power supply 46, which is purchased from TekTran Division of Air Products & Chemical, Inc., the majority of modifications are a direct result of incorporating the electrostatic reading devices 63a through f into the control of the welding system 10.

The modification of the arc voltage control unit 42 is limited to the addition of the linear potentiometer 71, arranged to cause movement of the wiper 72 in accordance with the movement of the torch 43, and the attachment of the torch 43 and the mechanical sensor 44.

The electrostatic reading devices 63a through f, as purchased from Research, Inc., require considerable modification. The function of the reading devices 63a through f is to accept a card encoded with information and, on command, propel the card through the device and past a station at which the relative position of the interruption of the normally uniform electrostatic field is detected. At a point in the movement of the card through the device where the base line is re-established, the card is automatically recycled to the initial position assumed by the card when inserted.

The welding speed of the system 10, or, at least, the maximum speed desired, is in excess of the speed with which the card is capable of being propelled through the electrostatic reading device 63a through f as initially purchased. Since the speed at which the card is propelled directly effects the speed of the torch 43 while under the control of the reading device 63a through f, the card speed is a critical factor. For this reason, the reading devices 63a through f are altered, as noted above, to speed up the movement of the card through the reading station.

The cards to be read by the electrostatic reading devices 63a through f are also preferably modified physically in order that the various cards to be read by the reading devices are incapable of incorrect insertion into the devices.

Modifications, changes and improvements to the form of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:
1. In a system for automatically guiding a welding apparatus including a welding torch relative to a convoluted surface having a plurality of substantially dominant convolutions within a surface contained substantially in a single plane to weld one such convoluted surface to another such surface substantially in the same plane and having substantially, identical convolutions to be welded to the convolutions of the first such surface, control apparatus controlling the movement of said torch, said control apparatus comprising first drive means moving said torch in a direction parallel to said single plane of said convoluted surfaces, second drive means moving said torch in a direction normal to said single plane of said convoluted surfaces, third drive means moving said torch rotationally about an axis parallel to said single plane, and transverse to the direction of movement caused by said second drive means, first control means activating said first drive means, a mechanical sensor sensing and producing signals only in response to said substantially dominant convolutions within said single plane of said convoluted surface, second control means activating said first, second and third drive means in response to the signals from said mechanical sensor at each said dominant convolution, respectively, and at least one selectably programmable memory means, activated by said mechanical sensor, and continuously providing variable information to said first and second control means to control movement of said torch as said torch traverses each said dominant convolution, respectively.

2. A control apparatus according to claim 1 in which said programmable memory means includes means for transporting therethrough a card member having continuously variable information determining the movement of said welding apparatus stored thereon by altering an effectively uniform electrostatic field on said card member and said programmable memory means further including means for electrostatically detecting the continuously variable information on said card member as a function of the altering of said effectively uniform electrostatic field to be utilized as inputs to one of said control means.

3. A control apparatus according to claim 1 in which said third drive means includes superimposed first and second arc segments permanently connected having independent first and second ring gear portions correspondingly at the peripheries thereof and first and second motor drives engaging said first and second ring gear portions independently, respectively, said second motor drive causing rotational movement of said welding apparatus relative to said second ring gear portion and said first motor drive causing rotational movement of said first ring gear portion relative to the movement of said second motor drive.

4. In a system for automatically guiding a welding apparatus relative to a convoluted surface resulting in the welding of one convoluted surface to another identically convoluted surface, the system having clamping means securely grasping the convoluted surface and supporting the system regardless of orientation, a carriage supported by said clamping means selectively positionable relative to said convoluted surface and a weld head assembly effecting the welding, apparatus maintaining the welding apparatus consistently perpendicular to the convoluted surface at a precise point where welding is to occur, comprising a first subcarriage slidably mounted on said carriage, first drive means associated with said first subcarriage, moving said first subcarriage normal to said carriage, a first arc segment having a portion of a ring gear at the periphery of said first arc segment, said first arc segment supported by said first subcarriage, second drive means associated with said first subcarriage engaging the portion of a ring gear of said first arc segment and moving said first arc segment relative to said first subcarriage, a second arc segment having a portion of a ring gear at the periphery of said second arc segment, said second arc segment permanently attached to said first arc segment and precisely superimposed thereon, a second subcarriage supporting by said second arc segment having independent drive means associated therewith engaging the portion of a ring gear of said second arc segment and moving said second subcarriage relative to said second arc segment, and said weld head assembly fixedly secured to said second subcarriage, whereby controlled activation of said first and second drive means associated with said first subcarriage and said independent drive means associated with said second subcarriage results in the positioning of said weld head assembly perpendicular to said convoluted surface at any precise point to be welded.

5. A system for automatically guiding a welding apparatus relative to a convoluted surface to result in the welding of one convoluted surface to another identically convoluted surface, comprising clamping means for securely grasping the convoluted surface to support the system regardless of orientation, rail means including a rack gear supported by said rail means, said welding apparatus having a carriage including drive means engaging said rack gear causing said carriage to move longitudinally along said rail means, said carriage including a first subcarriage, said first subcarriage having a drive means causing movement normal to said rail means, a first arc segment supported by said first subcarriage having a portion of a ring gear at the periphery of said first arc segment, said first subcarriage including drive means engaging the portion of a ring gear of said first arc segment causing movement relative to said first subcarriage, a second arc segment having a portion of a ring gear at the periphery of said second arc segment, fixedly attached to said first arc segment and precisely superimposed thereon, a second subcarriage supported by said second arc segment including independent drive means engaging the portion of a ring gear of said second arc segment causing movement of said second subcarriage relative to said second arc segment, a weld head assembly fixedly secured to said second subcarriage, a sensor means included in said weld head assembly producing signals detecting substantial variations in said convoluted surface, and control means guiding said weld head assembly at a desired orientation relative to said convoluted surface and a predetermined distance from said convoluted surface as a result of said signals produced by said sensor means thereby directing activation of the various drive means and causing movement of the carriage and subcarriages.

6. A system according to claim 5 in which said clamping means releasably engages depressions formed in the convoluted surface by substantially dominant convolutions arranged with respect to one another so as to intersect at a plurality of predetermined positions on said convoluted surface.

7. A system according to claim 5 in which said first arc segment assists said weld head assembly in obtaining a perpendicular relationship with respect to the convoluted surface, said second arc segment assists said weld head assembly in obtaining a perpendicular relationship with respect to the convoluted surface, and said first and second arc segments cooperate in obtaining said perpendicular relationship.

8. A system according to claim 5 in which said control means includes programmable input means controlling the drive means responsible for movement of said first subcarriage, said first arc segment and said second subcarriage, respectively.

* * * * *